United States Patent

England

[11] Patent Number: 4,545,874
[45] Date of Patent: Oct. 8, 1985

[54] ELECTRO CHEMICAL MACHINING

[75] Inventor: David R. England, Bristol, England

[73] Assignee: Rolls-Royce Ltd., London, England

[21] Appl. No.: 613,529

[22] Filed: May 24, 1984

[30] Foreign Application Priority Data

Jun. 3, 1983 [GB] United Kingdom ................ 8315384

[51] Int. Cl.⁴ ................................. B23P 1/00
[52] U.S. Cl. .......................... 204/129.2; 204/224 M; 204/228
[58] Field of Search .................. 204/129.2, 224 M, 228

[56] References Cited

U.S. PATENT DOCUMENTS

| | | | |
|---|---|---|---|
| 3,288,693 | 11/1966 | Livshits | 204/224 M |
| 3,520,791 | 7/1970 | Pfau et al. | 204/228 X |
| 3,652,440 | 3/1972 | Dehner | 204/129.2 X |
| 3,679,567 | 7/1972 | Ballard | 204/129.2 X |
| 3,761,366 | 9/1973 | Drushel | 204/129.2 |
| 3,779,888 | 12/1973 | Bardahl et al. | 204/228 X |
| 3,884,790 | 5/1975 | Kobayashi et al. | 204/224 M |
| 4,331,524 | 5/1982 | Matthes | 204/129.25 |

OTHER PUBLICATIONS

"Zum Schutz der Elektroden" by Matthes, Jan. 29, 1982.

*Primary Examiner*—Donald R. Valentine
*Attorney, Agent, or Firm*—Parkhurst & Oliff

[57] ABSTRACT

In electrochemical machining, arcing across workpiece and forming electrode can result in both being scrapped. Efforts have been made to detect the electrical signals which develop on occurrence of the spark which normally terminates in an arc. Ordinary electrical noise however, tends to have similar amplitude to that of the spark and so make it difficult for the detection device to differentiate between that noise and spark noise. Consequently the machine tool was disabled though no spark had occurred. The invention enables differentiation between the two noise sources by virtue of detecting the term over which noise occurs. This is achieved by dividing the noise pulses into two trains and passing one train via a pulse delay device 32 to a gate 34 and passing the other train directly to the gate 34. If pulses from both trains arrive at the gate 34 this is indicative of the generation of a spark and the gate 34 emits a signal which is utilized to disable the machine.

7 Claims, 3 Drawing Figures

ELECTRO CHEMICAL MACHINING

The present invention relates to a machining process wherein an electrolyte is caused to bridge a gap between a workpiece anode and a tool cathode whilst an electro field is set up in the gap, so as to bring about electro chemical machining of the workpiece anode.

More particularly, the invention relates to a method and apparatus for controlling de-activation of the process.

It is very important to prevent the generation of an electric arc across the gap. Such arcs normally start in the form of individual sparks which if ignored, propagate into a continuous arc and so damage and possibly result in scrapping of the workpiece and/or tool. When the preventitive methods fail, the machine must be switched off so as to at least reduce the damage which would otherwise occur.

When a spark occurs, broad band high frequency electrical noise is generated. The power supply however, consisting as it usually does of a three phase, fully controlled voltage regulator feeding a transformer and rectifier, generates a great deal of electrical noise itself, the characteristics of which are very similar to those of the spark noise.

It is known, to provide means whereby occurrance of a machining spark is detected. However, the similarity of amplitudes of the noise produced by the machining spark and noise produced by the circuity, has resulted in switch off being achieved when in fact, no machining spark has been generated.

It is an object of the present invention to provide an improved method of detecting generation of machining sparks with consequent disabling of the machine.

It is a further object of the present invention to provide apparatus with which to perform the method.

According to one aspect of the present invention a method of disabling an electro chemical machine tool comprising the steps of filtering and digitising electrical noise signals which are generated by operation of the machine tool and by generation of sparks across the machining gap, detecting resulting pulses of a given amplitude and above, dividing the detected pulses into two streams and passing both streams towards a common input point, one stream being passed at the rate of production of its pulses and each pulse of the other stream being passed over a period of time corresponding to the period of time over which spark signals are produced and if pulses from both streams reach said common input point, deriving a signal therefrom with which to disable the machine tool.

Preferably the method includes passing each pulse of the other stream via pulse delaying means towards said common input.

The method may include the step of preventing pulses of said other stream from reaching the common input during the initial operating period of machine tool.

A further aspect of the invention provides apparatus adapted for the disabling of an electro chemical machine tool comprising a filter for filtering electrical noise signals during operation of the machine tool, digitising means whereby filtered signals are pulsed, pulse amplitude detecting means connected to sense those of said pulses which have a given amplitude and above, a pulse gate and pulse delaying means for passing sensed pulses at a reduced frequency to said gate, a pulse delaying means by-pass connection to said gate, said gate being adapted to give a useful output only in receipt of pulses via both delaying means and by-pass connection, and means for receiving said useful output and utilizing it to bring about disablement of an associated electro chemical machine tool.

There may be provided further pulse delay means connected between the output of the pulse delay means and the output gate and arranged so as to further delay delayed pulses only during initial operation of an associated electro chemical machine tool.

Preferably the pulse delay means comprises dual re-triggerable monostables arranged in series.

Preferably the means for receiving and utilizing the useful signals if any, comprises a bistable.

The invention will now be described by way of example and with reference to the accompanying drawings in which.

Figure 1:
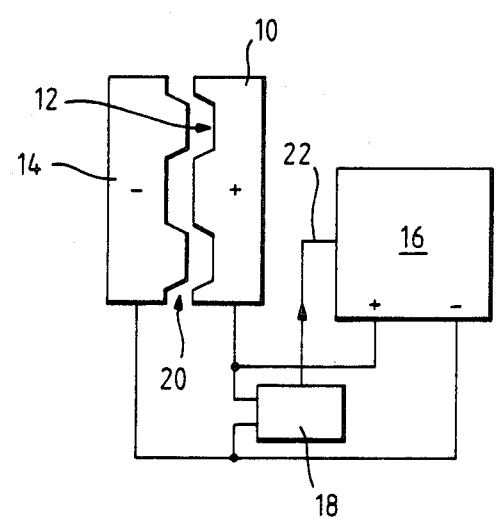
FIG. 1 is a diagrammatic view of an electro chemical machine tool in accordance with the invention.

In FIG. 1 a workpiece 10 has a shape 12 electro chemically machined in a surface by an appropriately shaped machine tool electrode 14, in known manner. A power supply unit 16 provides the electrical power necessary to achieve the machining action.

A machine tool disabling device 18 is connected across the circuit, such that in operation of the machine tool the device 18 receives electrical signals which result from the electrical circuitry of the machine tool and electrical discharges if any, in the form of sparks across the gap 20 between the machining electrode 14 and workpiece 10.

The device 18 is connected via line 22 to the power supply unit 16 for the purpose of disabling the machine tool in a manner to be described hereinafter.

Figure 2:
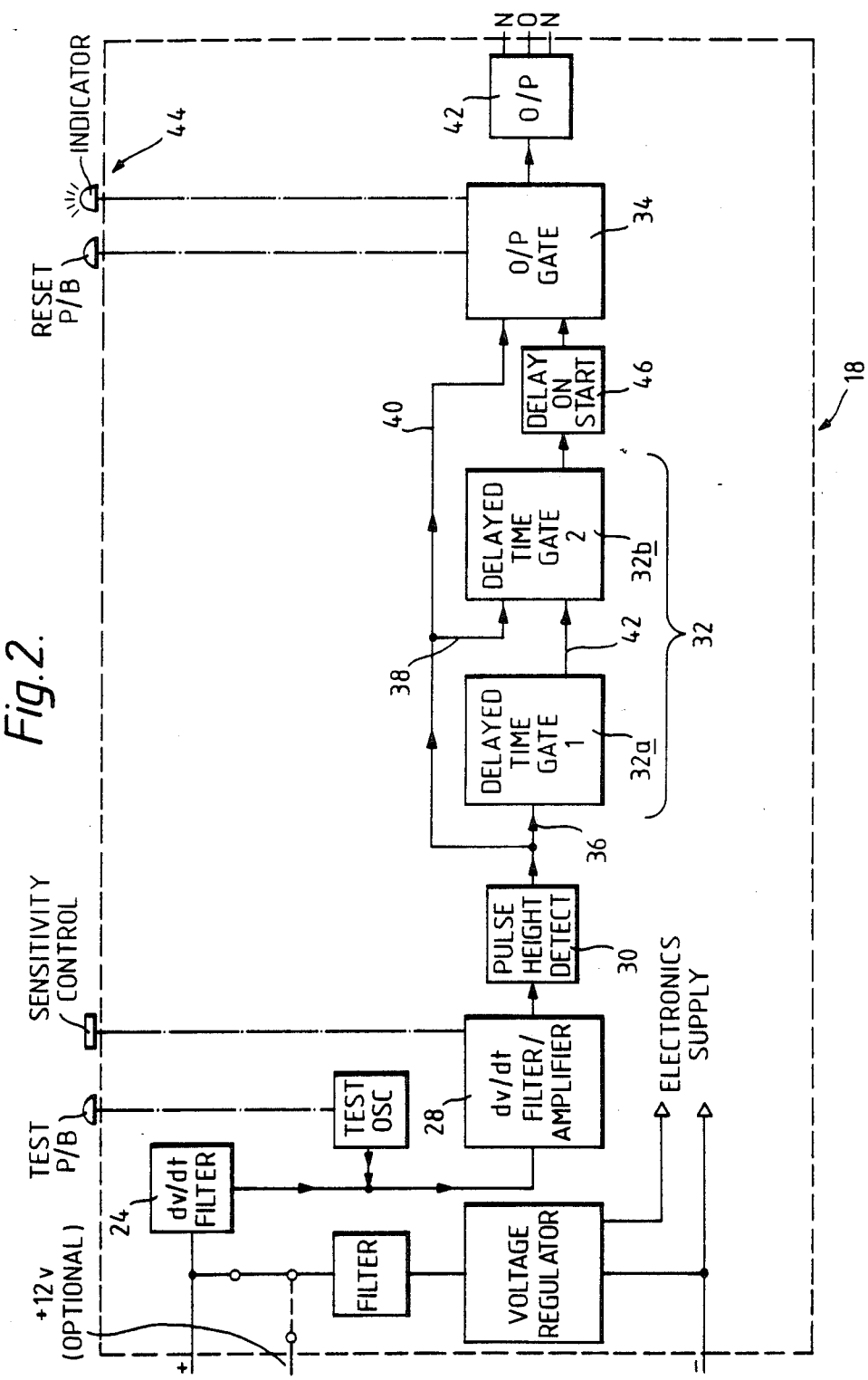
FIG. 2 is a block diagram of part of the circuit for the machine tool of FIG. 1.

Referring now to FIG. 2. The device 18 comprises a filter 24 connected via a line to the machining circuit, so as to receive the noise signals generated by operation of the machining circuitry and by generation of sparks, i.e. undesired electrical discharges across the gap 20 (FIG. 1). The filter passes the signals in the form of voltage pulses, to an amplifier 28 which after amplifying the signals, passes them still in the pulseform, to a pulse height detector 30. The pulse height detector 30 is so arranged as to only pass on those pulses which have a pre-selected minimum amplitude.

Pulses detected by the detector 30 derive from machine circuitry i.e. the switching action of diodes and thyristors and from intermittant electrical arcing across the machining electrode 14 and the workpiece 10 (FIG. 1).

Observation has shown, that the former tends to generate short term, high frequency electrical noise and the latter to generate long term high frequency electrical noise. In order to avoid the machining tool being disabled by a wrong pulse, a pulse delay device 32 is inserted between the output of pulse height detector 30 and a final output gate 34 which is a single, re-triggerable monostable. The function of gate 34 is to gate that pulse, if any, which will disable the machine tool in mid operation.

The pulse delay device consists of two pairs of dual re-triggerable monostables 32a and 32b arranged in line, the second in each pair emits a pulse after the duration of the time delay output from the first in each pair.

The second pair of dual re-triggerable monostables 32b will only operate on receipt of signals of direct pulses from the pulse height detector and delayed pulse from the first pair of dual retriggerable monostables 32a, hence the delaying effect.

During operation, the pulsed output from pulse height detector 30 is effectively divided, each pulse being taken via line 40 directly to output gate 34, via line 38 directly to monostable 32b and via line 36 to monostable 32a.

The components of the monostables 32a, 32b are chosen so that the time which elapses from a pulse entering monostable 32a to a consequent pulse being emitted by monostable 32b, corresponds to the long term over which machining sparks are generated. It follows that, if on the consequent pulse reaching gate 34, gate 34 is still receiving pulses directly from the pulse height detector 30 via line 40, these latter pulses must be spark generated pulses. Gate 34 is thus switched and its resulting output activates a 'D' type latch 42 which consequently switches on a lamp 44 in the form of a light emitting diode. This in turn trips a relay 48 (FIG. 3) which disables the machine tool. The circuit could easily be arranged such that activation of the 'D' type latch 42 would directly trip the relay 46. The lamp however, provides a visual indication of machine tool disablement.

A "delay on start" device 46 is provided between the monostable 32b and the output gate 34. When the machine tool is initially activated, its electrical circuitry generates more high frequency noise of long duration than when the machine tool has been operating for a short time. The device 46, which is a timer, delays the passing of the output of monostable 32b to the gate 34, for a time which is sufficient to allow the machine tool to stabilize. The pulses are thus obviated by the time device 46 is cut out.

Figure 3:
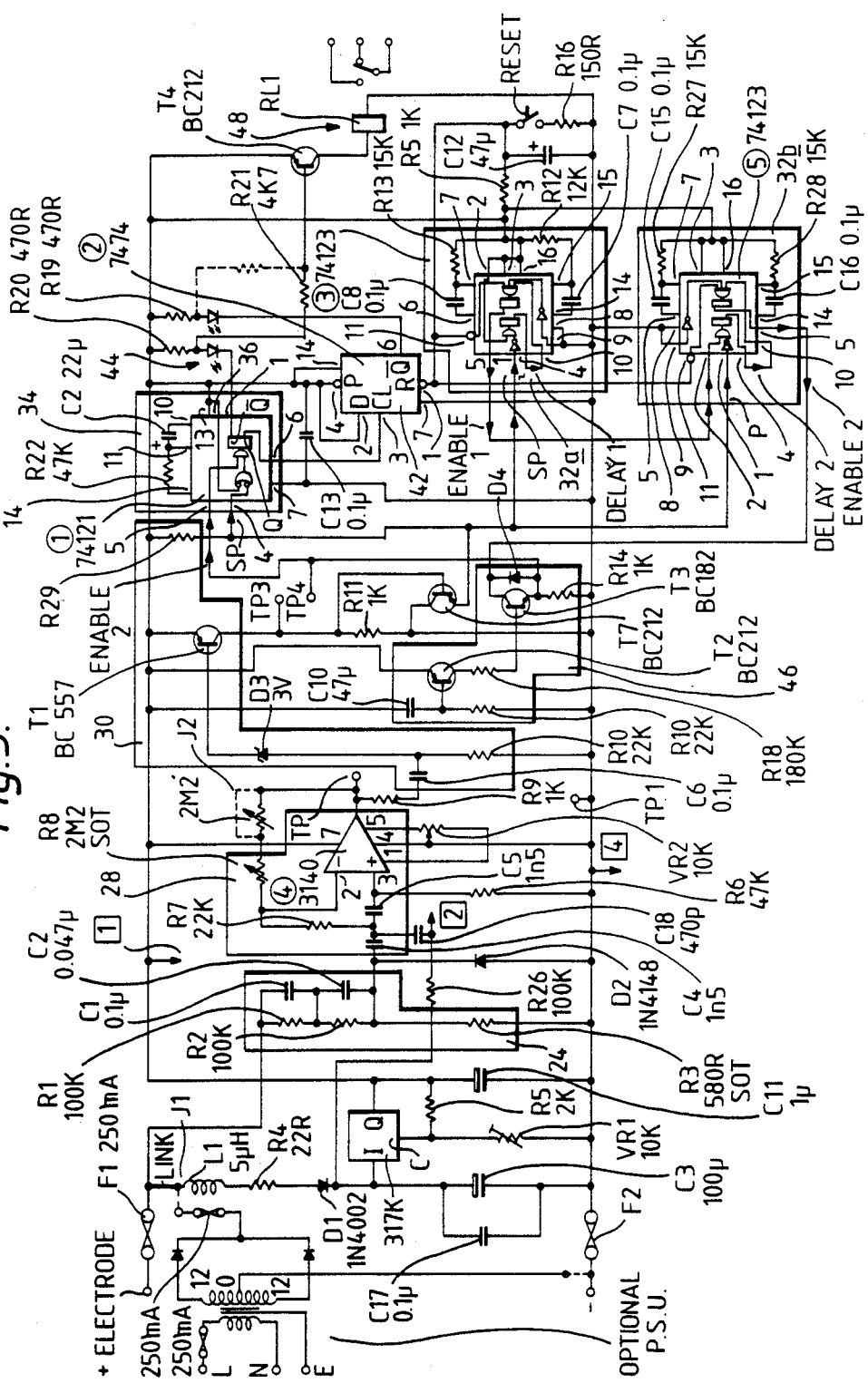
FIG. 3 is the circuit diagram represented by the blocks of FIG. 2.

Brief reference will now be made to FIG. 3, which is the circuit diagram corresponding to the block diagram of FIG. 2. Those components contained by inference in the respective blocks of FIG. 2, are bounded by corresponding blocks in FIG. 3 and in consequence have like reference numerals. The components themselves will not be described in as much as they are easily recognizable by the man skilled in the art.

I claim:

1. A method of disabling an electro chemical machine tool having a machining gap comprising the steps of:

filtering electrical noise signals which are generated across the machining gap by operation of the machine tool and by generation of sparks across the machining gap;

generating a stream of pulses representative of the filtered signal, each pulse having a substantially uniform duration and a height representative of the amplitude of the filtered signal at the time the pulse is generated;

detecting which pulses have at least a given amplitude;

dividing the detected pulses into two streams and passing both streams to a common input point, each pulse of one stream being passed to the common input point without substantial delay and each pulse of the other stream being passed after being delayed by a time period corresponding to the period of time over which spark signals are produced; and if pulses in each stream reach said common input point substantially simultaneously, deriving a signal therefrom with which to disable the machine tool.

2. The method of disabling an electro chemical machine tool as claimed in claim 1, wherein each pulse of said other stream is passed via pulse delaying means to said common input point.

3. The method of disabling an electro chemical machine tool as claimed in claim 1, further comprising the steps of preventing any of said pulses of said other stream from reaching said common input point during an initial operating period of the machine tool.

4. Apparatus for disabling an electro chemical machine tool having a machining gap comprising:

a filter for filtering electrical noise signals across the machining gap during operation of the machine tool;

digitising means whereby filtered signals are detected and corresponding pulses of uniform duration and of height representative of the amplitude of the filtered signals are generated;

pulse amplitude detecting means for detecting which of said pulses have at least a given amplitude;

a pulse gate, pulse delay means for passing detected pulses to said gate after delaying each pulse by a time period corresponding to the period of time over which spark signals are produced; and a pulse delay means by-pass connection to said gate for passing said detected pulses to said gate without substantial delay;

said pulse gate being adapted to generate an output signal only upon substantially simultaneous receipt of pulses via both said delay means and said by-pass connection; and means responsive to any said output signal for disabling said electro chemical machine tool.

5. The apparatus as claimed in claim 4, further comprising additional pulse delay means connected between the output of said pulse delay and the pulse gate for further delaying the delayed pulses during initial operation of the electro chemical machine tool.

6. The apparatus as claimed in claim 4 wherein said pulse delay means comprise dual re-triggerable monostables arranged in series.

7. The apparatus as claimed in claim 4, wherein the means responsive to said output signal comprises a bistable.

* * * * *